US011677639B2

(12) United States Patent
Porter et al.

(10) Patent No.: US 11,677,639 B2
(45) Date of Patent: Jun. 13, 2023

(54) CONNECTION MANAGEMENT BETWEEN APPLICATIONS AND SERVICE RESOURCES

(71) Applicant: Microsoft Technology Licensing, LLC, Redmond, WA (US)

(72) Inventors: Bryan Porter, Saint Charles, MO (US); Jerry K. Orman, Aliso Viejo, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 593 days.

(21) Appl. No.: 14/720,174

(22) Filed: May 22, 2015

(65) Prior Publication Data
US 2016/0344599 A1 Nov. 24, 2016

(51) Int. Cl.
H04L 41/5025 (2022.01)
H04L 43/0864 (2022.01)
H04L 47/283 (2022.01)
H04L 41/50 (2022.01)
H04L 67/10 (2022.01)

(52) U.S. Cl.
CPC ...... *H04L 41/5025* (2013.01); *H04L 41/5032* (2013.01); *H04L 43/0864* (2013.01); *H04L 47/283* (2013.01); *H04L 67/10* (2013.01)

(58) Field of Classification Search
CPC .......................... H04L 43/0811; H04L 41/5025
USPC ........................................................ 709/224
See application file for complete search history.

(56) References Cited

U.S. PATENT DOCUMENTS

| 7,634,682 | B2 | 12/2009 | Black et al. | |
|---|---|---|---|---|
| 8,385,351 | B1* | 2/2013 | Chen | H04L 12/5692 370/230 |
| 8,458,530 | B2 | 6/2013 | Kini et al. | |
| 8,661,295 | B1* | 2/2014 | Khanna | H04L 67/125 714/43 |
| 8,806,632 | B2 | 8/2014 | Stefanidakis et al. | |
| 2003/0149685 | A1* | 8/2003 | Trossman | G06F 11/3055 |
| 2005/0265330 | A1* | 12/2005 | Suzuki | H04L 49/555 370/389 |
| 2007/0168496 | A1* | 7/2007 | Bansod | G06F 11/008 709/224 |
| 2008/0086731 | A1* | 4/2008 | Trossman | G06F 9/50 718/100 |
| 2008/0209046 | A1 | 8/2008 | Karkanias et al. | |
| 2009/0052332 | A1* | 2/2009 | Fukuyama | H04L 41/06 370/242 |

(Continued)

OTHER PUBLICATIONS

Pash, Adam, "Netalyzr Determines Your Network Health", Published on: Jun. 15, 2009, Available at: http://lifehacker.com/5291653/netalyzr-determines-your-network-health.

(Continued)

*Primary Examiner* — Kevin T Bates

(57) ABSTRACT

Systems, methods, and software technology are disclosed herein for monitoring for and reporting on degraded connections between applications and application resources. In an implementation, a connection service receives requests from an application to ascertain whether or not a connection between the application and an application resource has become degraded. The service probabilistically determines whether or not the connection has become degraded and replies to the application with information indicative of the same.

20 Claims, 8 Drawing Sheets

(56) References Cited

U.S. PATENT DOCUMENTS

| | | | |
|---|---|---|---|
| 2009/0222553 A1* | 9/2009 | Qian | H04L 43/00 709/224 |
| 2009/0222555 A1 | 9/2009 | Qian et al. | |
| 2014/0043973 A1* | 2/2014 | Groenendijk | H04L 41/5032 370/230 |
| 2014/0222983 A1 | 8/2014 | Dasgupta et al. | |
| 2014/0280921 A1 | 9/2014 | VanderKoy et al. | |
| 2014/0314400 A1* | 10/2014 | Lee | H04L 45/28 398/1 |
| 2016/0092296 A1* | 3/2016 | Ananthapadmanabh | G06F 11/0784 714/57 |

OTHER PUBLICATIONS

"Testing Network Connection With Ping", Retrieved on: Mar. 12, 2015, Available at: http://ebookfitness.net/tag/testing-network-connection-with-ping.

Christensen, Elden, "Tuning Failover Cluster Network Thresholds", Published on: Nov. 21, 2012, Available at: http://blogs.msdn.com/b/clustering/archive/2012/11/21/10370765.aspx.

"Network Failure Detection and Recovery in a Two-Node Windows Server 2000 Cluster", Published on: Dec. 10, 2014, Available at: http://support.microsoft.com/kb/242600/.

"Hidden Markov Chains Passive Network Monitoring", In Proceedings of Advanced Wireless Communications 1, VU 389.168, Nov. 18, 2013, 44 pages.

\* cited by examiner

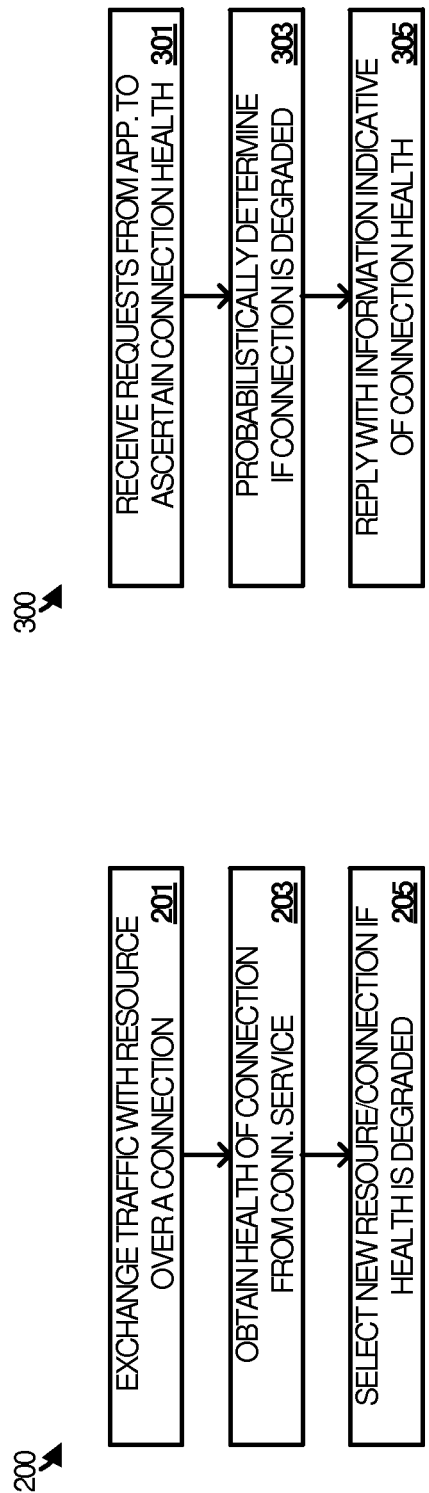

| 800 | GOOD | BAD |
|---|---|---|
| GOOD | good -> good (%) | good -> bad (%) |
| BAD | bad -> good (%) | bad -> bad (%) |

FIGURE 8

CONNECTION MANAGEMENT BETWEEN APPLICATIONS AND SERVICE RESOURCES

TECHNICAL BACKGROUND

Many examples abound of online services that are delivered to end users from high capacity, remote service environments. Examples include social networks, gaming services, email, productivity suites, financial and accounting platforms, and music and video services. End users access the services on their personal computing devices through local applications that interface with applications running in the service environments.

Any given service may involve many instances of an application or applications that are installed on servers in a data center, on-premises, or in some other suitable facility. Additional computing resources may be involved in the provisioning and delivery of a service, such as data stores, security resources, and the like.

The performance of connections between an application and the other resources involved in providing a service can play a large part in the experience enjoyed by the end-user. When the connections are healthy, the user experience is smooth and uninterrupted, assuming the connection between the user and the application is healthy. When the connections are degraded, the end-user may experience delay and other undesirable artifacts of poorly performing connections.

Various monitoring techniques are used to ensure that the connections between applications and resources are healthy. The Internet Control Message Protocol (ICMP) is one tool that is used to send ping messages to test the connection between two nodes. However, this technique adds traffic to the underlying network and the test traffic is generally not representative of the actual traffic exchanged in the context of a service session. In fact, such test packets may be dropped by intermediate devices on the connection (routers, switches, etc.) if those devices are in a congested state, further limiting their effectiveness.

Overview

Technology is disclosed herein that monitors for and reports on degraded connections between applications and application resources. In an implementation, a connection service receives requests from an application to ascertain whether or not a connection between the application and an application resource has become degraded. The service probabilistically determines whether or not the connection has become degraded and replies to the application with information indicative of the same.

In some implementations, in order to probabilistically determine whether or not a connection has become degraded, the connection service identifies past state transitions represented in samples of past performance of the connection. From the past state transitions represented in the samples, the service predicts future state transitions. The probability that the connection will become degraded is then identified based on the future state transitions.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 2 illustrates a connection management process employed by an application in an implementation.

FIG. 3 illustrates a connection management process employed by a connection service in an implementation.

FIG. 8 illustrates a connection health matrix in an implementation.

TECHNICAL DISCLOSURE

When computers are communicating with one another, it is useful to understand the performance characteristics of the underlying network to determine if the network medium, with all its complexity, is in a healthy state. Knowing the health state of the network can allow software to select the most efficient and best-performing computers to communicate with.

Enhanced connection management technology disclosed herein samples the round trip time statistics of the ambient network traffic being sent by an application on a computer system to one or more remote computer systems. Acquiring the ambient network traffic statistics obviates the need for artificial traffic to be sent over the network. In some implementations, a Markov chain is employed to evaluate the health state of a connection using a transition matrix that is populated with data on the past N packet performance samples, allowing a connection service to probabilistically determine when a network path has entered a degraded state.

Figure 1:
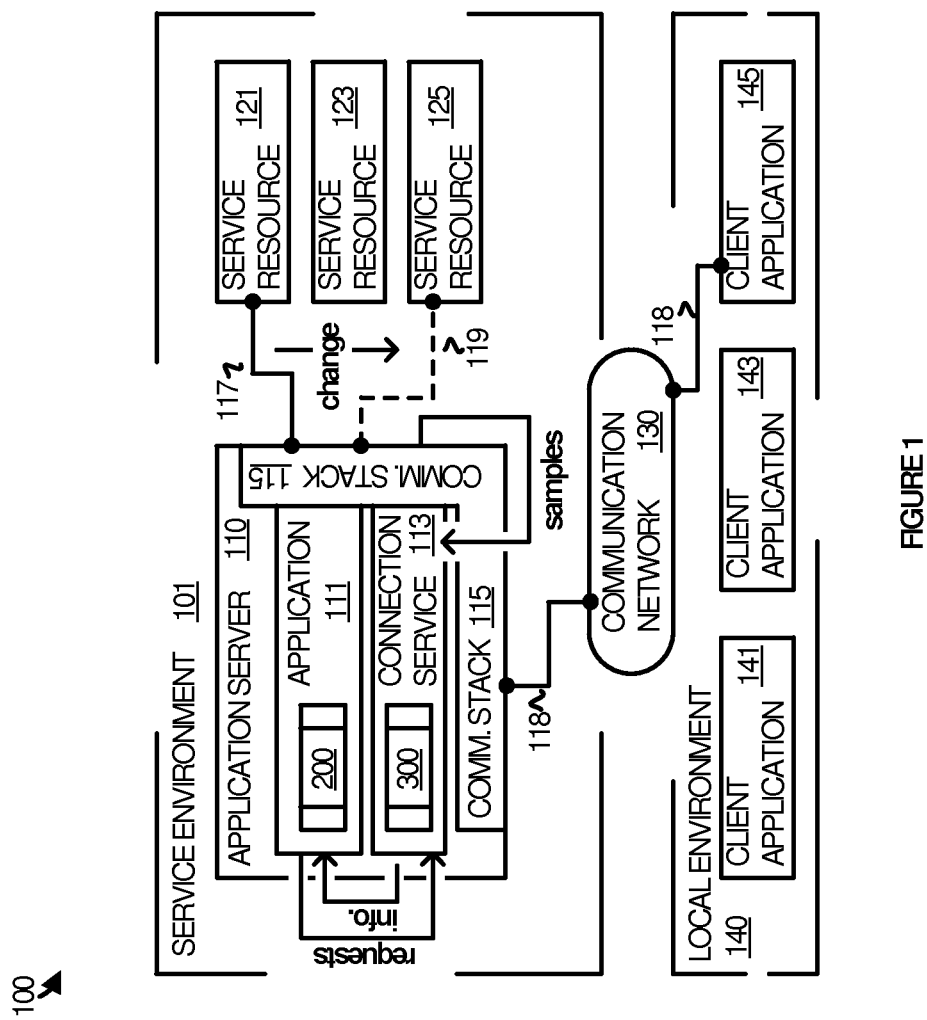
FIG. 1 illustrates an implementation of enhanced connection management.

FIG. 1 illustrates an implementation 100 of enhanced connection management technology Implementation 100 involves a service environment 101 from where an online service is provisioned and delivered to a local environment 140. Examples of the online service include, but are not limited to: personal information management services (email), document productivity services (word processing, spreadsheets, presentations, and collaboration), telecommunication services (voice calls, video conferencing), gaming services, social networking services, media services (music, videos), and e-commerce services, as well as any other service, combination of services, or variations thereof.

Service environment 101 includes application server 110 that hosts an application 111 that provides the service. Various services resources may also be involved in the provisioning and delivery of the service, of which service resources 121, 123, and 125 are representative. Service environment 101 may optionally include additional application servers and resources and is not limited to the single-server use case described herein.

Application server 110 includes a communication stack 115 through which application 111 communicates with service resources 121, 123, and 125. Application 111 may also communicate with client applications in local environment 140 through communication stack 115. Connection service 113 is also included in application server 110 and interfaces with communication stack 115 to monitor for and report on degraded connections between application 111 and service resources 121, 123, and 125.

Figure 9:
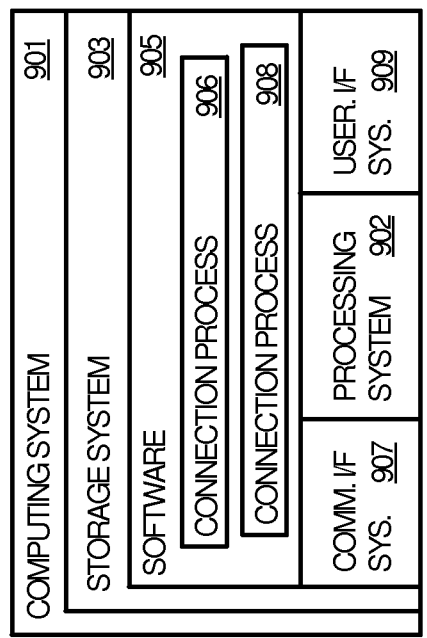
FIG. 9 illustrates a computing system suitable for implementing the enhanced connection management technology disclosed herein, including any of the elements, processes, and operational scenarios illustrated in the Figures and discussed below in the Technical Disclosure.

Application server 110 may be any physical or virtual server computer capable of hosting application 111 and connection service 113, of which computing system 900, illustrated in FIG. 9, is representative. Other applications, in addition to or in place of application 111, may be hosted on application server 110. The online service may be provided by a single application (application 111) or by multiple applications working in a cooperative fashion.

Communication network 130 is representative of any network or collection of networks that may link service environment 101 with local environment 140. Client applications 141, 143, and 145 are representative of applications that users may interact with in order to obtain access to the online service provided by service environment 101. Local environment 140 is representative of any environment or environments considered separate or remote from service environment 101.

Client applications 141, 143, and 145 are each representative of any client application capable of communicating with application 111 (or any other application or component involved in the online service) over communication network 130. Examples of client applications 141, 143, and 145 include locally installed and executed applications (native apps), browser-based applications that execute in the context of a web browser, streaming applications, and mobile applications, as well as any other type of application, combination of application types, or variations thereof. Client applications 141, 143, and 145 may be executed by any suitable computing device, of which computing system 900, illustrated in FIG. 9, is representative.

In operation, application 111 makes connections to one or more resources through communication stack 115 in the context of providing a service session to a client application. The connection may be, for example, a transmission control protocol/Internet protocol (TCP/IP) connection over which session traffic may be exchanged. Application 111 communicates with the client application over communication network 130. In implementation 100, connection 117 is representative of a connection established between application 111 and service resource 121, while connection 118 is representative of a connection established between application 111 and client application 145.

To ensure that a healthy connection is maintained with a service resource, application 111 employs connection process 200, illustrated in FIG. 2. Connection process 200 is representative of the functionality that may be provided by any program module, component(s), or other software element, or collection thereof, that may be implemented in application 111.

Referring parenthetically to the steps illustrated in FIG. 2, application 111 exchanges traffic with service resource 121 over connection 117 to obtain data for a session with client application 145 (step 201). While the connection is ongoing, application 111 may periodically (or at some other interval) obtain the health of the connection from connection service 113, such as by making a request for health information (step 203).

Upon receiving the information from connection service 113, application 111 either maintains the connection or selects a new connection (step 205). Application 111 maintains the connection if the information indicates that the connection is healthy. However, if the information indicates that the connection is not healthy and has become degraded, then application 111 selects a new connection, and effectively a new resource. In implementation 100, it is assumed for exemplary purposes that connection 117 to service resource 121 has become degraded. Application 111 selects a new resource, service resource 125, and establishes a new connection, connection 119, to that resource accordingly.

Connection service 113 employs connection process 300, illustrated in FIG. 3, to assist with maintaining healthy connections. Connection process 300 is representative of the functionality that may be provided by any program module, component(s), or other software element, or collection thereof, that may be implemented in connection service 113.

Referring parenthetically to the steps illustrated in FIG. 3, connection service 113 receives requests from application 111 (or any other application running on application server 110) to ascertain the health of a connection or connections between the application and any given service resource (step 301). Connection service 113 determines probabilistically whether or not the connection is degraded (step 303) and replies with information indicative of the health of the connection (step 305).

Determining probabilistically whether or not a connection has become degraded means evaluating the likelihood that a connection will become degraded and, if more likely than not, then categorizing the connection as degraded, even if the connection has not yet actually become degraded. In this manner, an application can move away from a connection-resource pair that is likely to become degraded in the future. Such pro-active connection management has the technical effect of mitigating traffic delay associated with degraded connections. As back-end connections between applications and services resources can account for much of the delay experienced between applications and clients, reducing the back-end delay may also improve the user experience.

Figure 4:
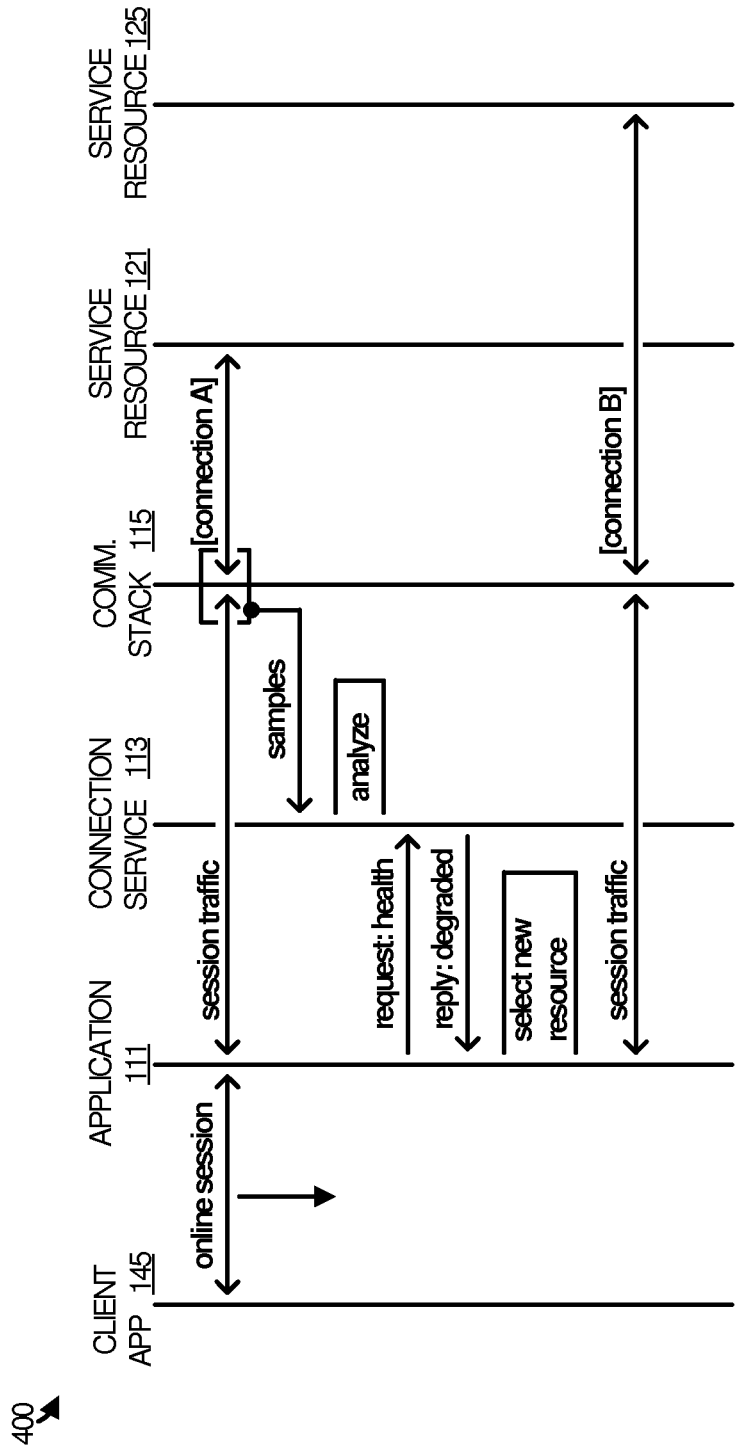
FIG. 4 illustrates an operational sequence in an implementation.

FIG. 4 illustrates an operational sequence 400 in an example of implementation 100. In operation, client application 145 establishes an online session with application 111, to provide a user with access to an online service. As part of the service, application 111 may exchange session traffic with service resource 121. The session traffic flows through communication stack 115 to service resource 121 on a connection (A, in this example).

Communication stack 115 maintains performance statistics on the traffic. Examples of performance statistics include round trip time, average delay, and the like. Connection service 113 periodically (or at some other interval) queries communication stack 115 for samples of the statistics. Connection service 113 runs as a background process relative to application 111 and analyzes the sampled statistics to determine whether or not the present connection between application 111 and service resource 121 is degraded.

When application 111 queries connection service 113 for the status of a connection, connection service 113 is able to respond with information indicative of whether or not the connection is degraded. In this example, it is assumed for illustrative purposes that the connection is degraded and application 111 selects a new resources to utilize accordingly. Application 111 proceeds to setup a new connection with the new resource (B) and commences to exchange session traffic over that connection.

Figure 5:
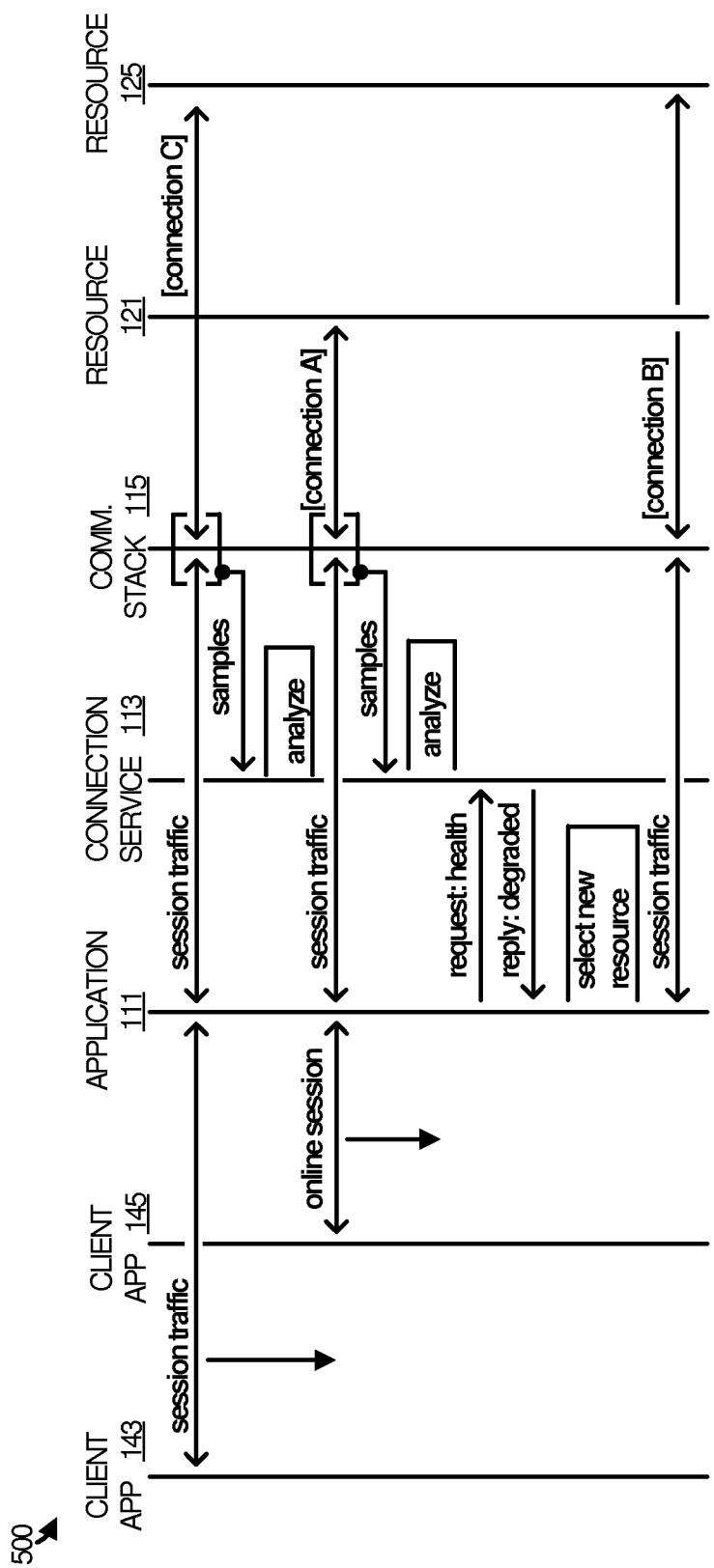
FIG. 5 illustrates an operational sequence in another implementation.

FIG. 5 illustrates another operational sequence 500 in an example of implementation 100. In operation, client application 143 establishes an online session with application 111, to provide a user with access to an online service. As part of the service, application 111 may exchange session traffic with service resource 125. The session traffic flows through communication stack 115 to service resource 125 on a connection (C, in this example).

Communication stack 115 maintains performance statistics on the traffic. Connection service 113 periodically (or at some other interval) queries communication stack 115 for samples of the statistics and analyzes the sampled statistics to determine whether or not the present connection between application 111 and service resource 125 is degraded.

At about the same time, client application 145 may also establish an online session with application 111, to provide another user with access to the online service. As part of the service, application 111 may exchange session traffic with service resource 121. The session traffic flows through communication stack 115 to service resource 121 on a connection (A, in this example). Communication stack 115 maintains performance statistics on the traffic, which can be requested by connection service 113. Connection service 113 analyzes the sampled statistics to determine whether or not the present connection between application 111 and service resource 121 is degraded.

When application 111 queries connection service 113 for the status of a connection, connection service 113 is able to respond with information indicative of whether or not the connection is degraded. In this example, it is assumed for illustrative purposes that the connection is degraded and application 111 selects a new resource to utilize accordingly. Application 111 proceeds to setup a new connection with the new resource (B) and commences to exchange session traffic over that connection.

Connection service may also be able to return the health of connection C to application 111 when application 111 queries for it. Such information would allow application 111 to evaluate which resource would be better to connect to, in lieu of service resource 121. But in either case, connection service is capable of monitoring the health of more than one connection made through application 111 to a service resource.

Figure 6:
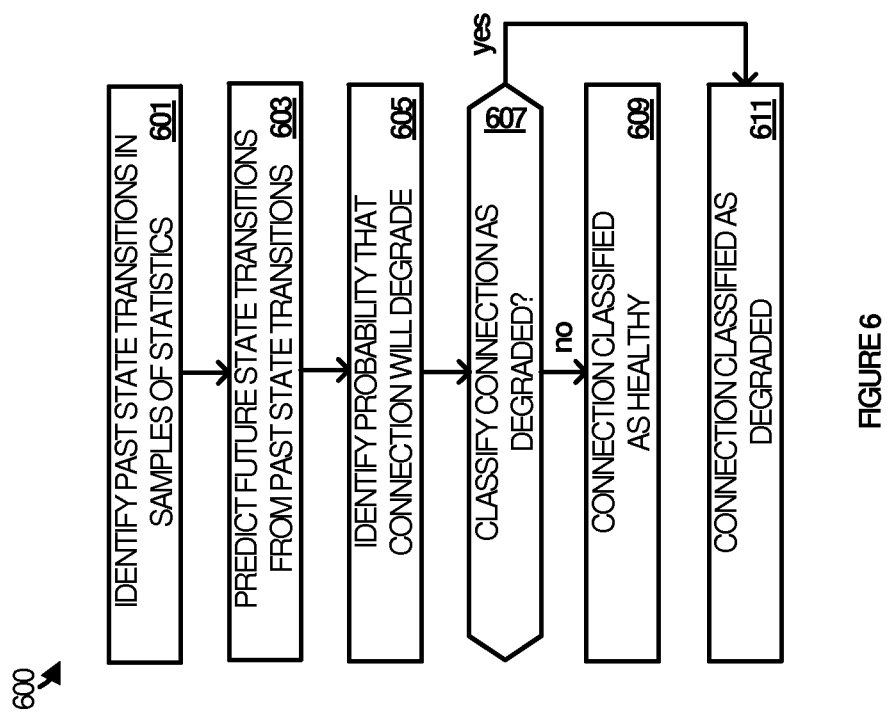
FIG. 6 illustrates a connection management process employed by a connection service in an implementation.

FIG. 6 illustrates another connection process 600 that may be employed by connection service 113 to ascertain whether or not to categorize a connection as degraded. Connection process 600 may be implemented in any program module, component, or other programmatic element (or collection thereof) in connection service 113. The steps illustrated in FIG. 6 are representative of the functionality that may be achieved by connection process 600 when executed in the context of connection service 113.

Referring parenthetically to the steps in FIG. 6, connection service 113 obtains samples of traffic performance from communication stack 115 and analyzes the samples to identify past state transitions in the samples (step 601). For example, the performance represented in one sample may qualify that sample as good, while the performance represented in the next sample may qualify the next sample as bad. The state transition from the first to the next sample would one of good-to-bad. Connection service 113 would note this and would continue with the rest of the samples.

Once a set of samples has been analyzed, the past state transitions derived from the samples are analyzed to predict future state transitions (step 603). Connection service 113 then identifies from the predicted future state transitions a probability that the connection will become degraded (step 605).

If the probability suggests that the connection will not become degraded, then the connection is classified as healthy (step 609). If the probability suggests that the connection will become degraded (step 607), then the connection is classified as degraded (step 611). Should an application request its status, connection service 113 may reply with its degraded state.

Figure 7:
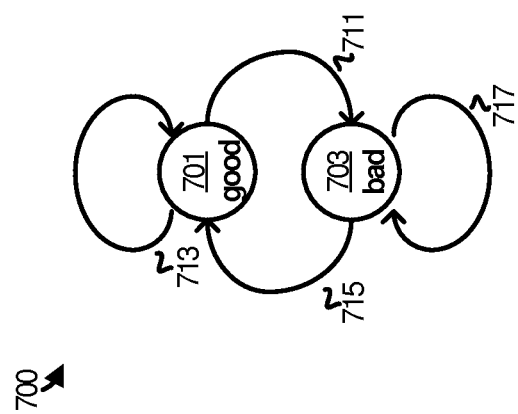
FIG. 7 illustrates a state diagram in an implementation.

FIG. 7 illustrates a state diagram 700 in an example that demonstrates the various state transitions that could be made by a connection. State diagram 700 includes two states: a good state 701 and a bad state 703. The two states may correspond to different performance levels as measured by various statistics, such as average round trip time, average delay, and the like. The possible transitions between the states include four: a first transition 711 from good to bad; a second transition 713 from good to good; a third transition 715 from bad to good; and a fourth transition 717 from bad to bad.

Connection service 113, employing connection process 600, may analyze the sampled performance of a connection to determine what state transitions the connection has gone through during a past period of time. The past state transitions can be stored in a transition metrics, of which matrix 800 in FIG. 8 is representative.

Matrix 800 defines four possible state transitions that correspond to the transitions in state diagram 700. As a series of statistical samples are analyzed by connection service 113, the different possible transitions are counted. Matrix 800 is populated with a metric that represents what share of the past transitions each possible transition represents.

In operation, matrix 800 (which is a current state matrix) can be multiplied by a transition matrix (raised to a power that represents the future number of states to predict). The resultant matrix represents the probability that future samples will be in a bad state. When this is the case, a connection is considered to have become degraded.

In some implementations, connection service 113 may be a background process that iterates over all TCP connections being used on a small interval (over N milliseconds, where N is less than 1000 for example). For each TCP connection, the background process enables extended statistic collection from the underlying TCP/IP stack for that connection, and extracts for each connection the sampled and smoothed round trip times from the TCP/IP stack for that particular connection.

The background process uses these values to calculate the mean round trip times for each extracted metric for each connection, and based on the extracted values extracts the standard deviation for the round trip times of the connection. Once M samples have been collected, the background process begins to evaluate each subsequent sample collected to determine if the sample round trip time value is more than a single standard deviation of the mean of round trip times for that connection. If so, the background process flags the sample as representing a transition for the connection to a "bad" state. The number of transitions the connection makes from a good state (sampled value being within a standard deviation of the mean for the connection) to a bad state, from a bad state to a good state, from a good state to a good state, and from a bad state to a bad state, are tracked, as well as the total number of transitions seen from any state to any other state. From these values, a transition matrix is developed that describes the historical percentage of samples that transition between the various states.

At each sample, a current state matrix is calculated that describes the current state of the connection. This matrix is then multiplied by the calculated transition matrix raised to a power that represents the future number of states to predict. The resultant 1×2 matrix represents the probability that future samples will be in a particular state. When a majority of predicted future samples would be in a bad state, the connection is determined to have transitioned to a bad state and this information is made available for consumption by the application originating the traffic.

The background process may logs a message whenever a transition occurs from a healthy state to an unhealthy state for a given connection. This logged message can be used to notify operators of potential degradation in network health.

FIG. 9 illustrates computing system 901 that is representative of any system or collection of systems in which the various applications, services, scenarios, and processes disclosed herein may be implemented. Examples of computing system 901 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual machines, smart televisions, smart watches and other wearable devices, as well as any variation or combination thereof.

Computing system 901 may be implemented as a single apparatus, system, or device or may be implemented in a distributed manner as multiple apparatuses, systems, or devices. Computing system 901 includes, but is not limited to, processing system 902, storage system 903, software 905, communication interface system 907, and user interface system 909. Processing system 902 is operatively coupled with storage system 903, communication interface system 907, and user interface system 909.

Processing system 902 loads and executes software 905 from storage system 903. Software 905 includes connection process 906 and connection process 908, which are representative of the connection processes discussed with respect to the preceding FIGS. 1-8, including connection process 200, connection process 300, and connection process 600.

When executed by processing system 902 to enhance connection management capabilities, software 905 directs processing system 902 to operate as described herein for at least the various processes, operational scenarios, and sequences discussed in the foregoing implementations. Computing system 901 may optionally include additional devices, features, or functionality not discussed for purposes of brevity.

Referring still to FIG. 9, processing system 902 may comprise a micro-processor and other circuitry that retrieves and executes software 905 from storage system 903. Processing system 902 may be implemented within a single processing device, but may also be distributed across multiple processing devices or sub-systems that cooperate in executing program instructions. Examples of processing system 902 include general purpose central processing units, application specific processors, and logic devices, as well as any other type of processing device, combinations, or variations thereof.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which at least some of software 905 may be communicated internally or externally. Storage system 903 may be implemented as a single storage device, but may also be implemented across multiple storage devices or sub-systems co-located or distributed relative to each other. Storage system 903 may comprise additional elements, such as a controller, capable of communicating with processing system 902 or possibly other systems.

Software 905 may be implemented in program instructions and among other functions may, when executed by processing system 902, direct processing system 902 to operate as described with respect to the various operational scenarios, sequences, and processes illustrated herein. For example, software 905 may include program instructions for implementing enhanced connection management.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software or other application software, in addition to or that include connection process 906 or connection process 908. Other elements that may be present include those that facilitate a communication stack, of which communication stack 115 in FIG. 1 is representative. Software 905 may also comprise firmware or some other form of machine-readable processing instructions executable by processing system 902.

In general, software 905 may, when loaded into processing system 902 and executed, transform a suitable apparatus, system, or device (of which computing system 901 is representative) overall from a general-purpose computing system into a special-purpose computing system customized to facilitate enhanced connection management. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Referring again to FIGS. 1-8 as an example, through the operation of a computing system or systems of which computing system 901 is representative, transformations may be performed with respect to the various scenarios described therein. As an example, application 111 initially communicates with service resource 121 over connection 117. Upon employing connection processes 200 and 300, application 111 changes to service resource 125 and connection 119.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 909 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 909. In some cases, the input and output devices may be combined in a single device, such as a display capable of displaying images and receiving touch gestures. The aforementioned user input and output devices are well known in the art and need not be discussed at length here.

User interface system 909 may also include associated user interface software executable by processing system 902 in support of the various user input and output devices discussed above. Separately or in conjunction with each other and other hardware and software elements, the user interface software and user interface devices may support a graphical user interface, a natural user interface, or any other type of user interface.

Communication between computing system 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Certain inventive aspects may be appreciated from the foregoing disclosure, of which the following are various examples.

EXAMPLE 1

A method of operating a connection service to monitor for and report degraded connections between applications and application resources, the method comprising: receiving requests from an application to ascertain whether or not a connection between the application and an application resource has become degraded; probabilistically determining whether or not the connection has become degraded; and replying to the application with information indicative of whether or not the connection has become degraded.

EXAMPLE 2

The method of Example 1 wherein probabilistically determining whether or not the connection has become degraded comprises: identifying a plurality of past state transitions represented in samples of past performance of the connection between an application and an application resource; predicting a plurality of future state transitions based at least in part on the plurality of past state transitions represented in the samples; and identifying a probability that the connection will become degraded based at least in part on the plurality of future state transitions; wherein the information indicates that the connection has become degraded when warranted by the probability.

EXAMPLE 3

The method of Examples 1-2 wherein identifying the plurality of past state transitions comprises evaluating each sample in the samples of past performance to a previous sample in the samples of past performance to determine which one of a plurality of possible state transitions the sample represents.

EXAMPLE 4

The method of Examples 1-3 wherein the plurality of possible state transitions comprises a satisfactory-to-satisfactory transition, a satisfactory-to-unsatisfactory transition, an unsatisfactory-to-satisfactory transition, and an unsatisfactory-to-unsatisfactory transition.

EXAMPLE 5

The method of Examples 1-4 wherein the samples of the past performance of the connection between the application and the application resource comprise round-trip time statistics for network traffic sent on the connection.

EXAMPLE 6

The method of Examples 1-5 further comprising collecting the round-trip time statistics for the network traffic sent on the connection and collecting other round-trip time statistics for other network traffic sent on other connections between the application and other application resources.

EXAMPLE 7

The method of Examples 1-6 further comprising: receiving other requests from other applications to ascertain whether or not other connections between the other applications and other application resources have become degraded; probabilistically determining whether or not the other connections have become degraded; and replying to the other applications with other information indicative of whether or not the other connections have become degraded.

EXAMPLE 8

The method of Examples 1-7 wherein the application comprises an online application accessible to client applications over connections different than the connection between the application and the application resource.

EXAMPLE 9

The method of Examples 1-8 wherein the connection comprises a specific port allocated to the application for communicating with the application resource.

EXAMPLE 10

An apparatus comprising: one or more computer readable storage media; and program instructions stored on the one or more computer readable storage media that, when executed by a processing system, direct the processing system to at least: identify a plurality of past state transitions represented in samples of past performance of a connection between an application and an application resource; predict a plurality of future state transitions based at least in part on the plurality of past state transitions represented in the samples; identify a probability that the connection will become degraded based at least in part on the plurality of future state transitions; and communicate information to the application indicating that the connection has become degraded when warranted by the probability.

EXAMPLE 11

The apparatus of Example 10 further comprising the processing system that reads and executes the program instructions, wherein the application comprises an online application accessible to client applications over connections different than the connection between the application and the application resource and wherein the connection comprises a specific port allocated to the application for communicating with the application resource.

EXAMPLE 12

A service architecture for delivering an online service comprising: resource servers that host resources for providing the online service; application servers communicatively coupled with the resource servers; an application hosted on each of the application servers to provide the online service and that communicates requests to ascertain information on connections between the application and the resources; and a connection service hosted on each of the application servers that receives the requests from the application, probabilistically determines whether or not a connection has become degraded, and replies to the application with the information indicative of whether or not the connection has become degraded.

EXAMPLE 13

The service architecture of Example 12 wherein to probabilistically determine whether or not the connection has become degraded, the connection service: identifies a plurality of past state transitions represented in samples of past performance of the connection between an application and an application resource; predicts a plurality of future state transitions based at least in part on the plurality of past state transitions represented in the samples; and identifies a probability that the connection will become degraded based at least in part on the plurality of future state transitions; wherein the information indicates that the connection has become degraded when warranted by the probability.

EXAMPLE 14

The service architecture of Examples 12-13 wherein to identify the plurality of past state transitions, the connections service evaluates each sample in the samples of past performance to a previous sample in the samples of past performance to determine which one of a plurality of possible state transitions the sample represents.

EXAMPLE 15

The service architecture of Examples 12-14 wherein the plurality of possible state transitions comprises a satisfactory-to-satisfactory transition, a satisfactory-to-unsatisfactory transition, an unsatisfactory-to-satisfactory transition, and an unsatisfactory-to-unsatisfactory transition.

EXAMPLE 16

The service architecture of Examples 12-15 wherein the samples of the past performance of the connection between the application and the application resource comprise round-trip time statistics for network traffic sent on the connection.

EXAMPLE 17

The service architecture of Examples 12-16 further comprising collecting the round-trip time statistics for the network traffic sent on the connection and collecting other round-trip time statistics for other network traffic sent on other connections between the application and other application resources.

EXAMPLE 18

The service architecture of Examples 12-17 wherein the application hosted on each of the application servers comprises an online application accessible to client applications over connections different than the connections between the application and the resources.

EXAMPLE 19

The service architecture of Examples 12-18 wherein each of the connections comprises a specific port allocated to the application for communications with a given resource.

EXAMPLE 20

The service architecture of Examples 12-19 wherein the network traffic comprises actual service traffic exchanged between the application and the given resource in support of online session established between the application and a client application.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. A method of operating a connection service hosted in an application server in a service environment to monitor for and report on connections degrading between applications hosted in the application server and application resources external to the application server in the service environment, the method comprising:
   in the application server:
   the connection service querying a communication stack in the application server for performance statistics about a connection between an application hosted in the application server and one or more of the application resources;
   the connection service receiving one or more requests from the application to ascertain whether the connection has become degraded, wherein the connection occurs through the communication stack and supports an online session established between the application and a client application over another connection that differs from the connection;
   the connection service determining, based at least on the performance statistics, whether the connection has become degraded;
   the connection service replying to the application with information indicative of whether the connection has become degraded; and
   the application selecting a new connection based on the information.

2. The method of claim 1 wherein determining whether the connection has become degraded comprises:
   identifying a plurality of past state transitions represented in samples of past performance of the connection;
   predicting a plurality of future state transitions based at least in part on the plurality of past state transitions represented in the samples of past performance; and
   identifying a probability that the connection will become degraded based at least in part on the plurality of future state transitions;
   wherein the information indicates that the connection has become degraded when warranted by the probability.

3. The method of claim 2 wherein identifying the plurality of past state transitions comprises evaluating each sample in the samples of past performance to a previous sample in the samples of past performance to determine which one of a plurality of possible state transitions the sample represents.

4. The method of claim 3 wherein the plurality of possible state transitions comprises a satisfactory-to-satisfactory transition, a satisfactory-to-unsatisfactory transition, an unsatisfactory-to-satisfactory transition, and an unsatisfactory-to-unsatisfactory transition.

5. The method of claim 2 wherein the samples of past performance comprise round-trip time statistics for network traffic sent on the connection.

6. The method of claim 5 further comprising collecting the round-trip time statistics for the network traffic sent on the connection and collecting other round-trip time statistics for other network traffic sent on other connections between the application and other application resources in the service environment.

7. The method of claim 1 further comprising:
   in response to receiving other requests from other applications, determining whether other connections between the other applications and other application resources have become degraded; and
   replying to the other applications with other information indicative of whether the other connections have become degraded.

8. The method of claim 1 wherein the application employs a connection process that ensures a healthy connection is maintained with one or more of the application resources.

9. The method of claim 8 wherein the connection comprises a specific port allocated to the application for communicating with one or more of the application resources.

10. An apparatus comprising:
    one or more computer readable storage media;
    program instructions stored on the one or more computer readable storage media; and
    a connection service, hosted in an application server in a service environment, that monitors and reports on connections degrading between applications hosted in the application server and application resources external to the application server in the service environment, wherein the connection service, when executed by a processing system, directs the processing system to at least:
    in the application server:
    query, by the connection service, a communication stack in the application server for performance statistics about a connection between an application hosted in the application server and one or more of the application resources;
    identify a plurality of past state transitions represented in samples of past performance of the connection between the application and one or more of the application resources, wherein the connection between the application and one or more of the application resources occurs through the communication stack and supports an online session established between the application and a client application over another connection that differs from the connection;

determine, by the connection service, a plurality of future state transitions based at least in part on the plurality of past state transitions represented in the samples of past performance;

identify, by the connection service, a probability that the connection will become degraded based at least in part on the plurality of future state transitions;

communicate, by the connection service and based at least on the probability, information to the application indicating that the connection has become degraded; and select, by the application, a new connection based at least on the information.

11. The apparatus of claim 10 further comprising the processing system that reads and executes the program instructions, wherein the application employs a connection process to ensure that a healthy connection is maintained with one or more of the application resources, and wherein the connection comprises a specific port allocated to the application for communicating with one or more of the application resources.

12. A service architecture for delivering an online service comprising:

resource servers in a service environment that host resources for providing the online service;

application servers in the service environment communicatively coupled with the resource servers in the service environment;

an application hosted on at least one of the application servers in the service environment that communicates at least one request to ascertain information on at least one connection between the application and the resources, wherein the application comprises an online application accessible to client applications over connections different than the at least one connection, wherein the at least one connection occurs through a communication stack in the at least one of the application servers, and wherein the application selects a new connection based on the information; and a connection service hosted on the at least one of the application servers that queries the communication stack for performance statistics about the at least one connection, receives the at least one request from the application, determines whether the at least one connection has become degraded, and replies to the application with the information indicative of whether the at least one connection has become degraded.

13. The service architecture of claim 12 wherein to determine whether the at least one connection has become degraded, the connection service:

identifies a plurality of past state transitions represented in samples of past performance of the connection between the application and the resources;

predicts a plurality of future state transitions based at least in part on the plurality of past state transitions represented in the samples of past performance; and identifies a probability that the at least one connection will become degraded based at least in part on the plurality of future state transitions;

wherein the information indicates that the connection has become degraded when warranted by the probability.

14. The service architecture of claim 13 wherein to identify the plurality of past state transitions, the connections service evaluates each sample in the samples of past performance to a previous sample in the samples of past performance to determine which one of a plurality of possible state transitions the sample represents.

15. The service architecture of claim 14 wherein the plurality of possible state transitions comprises a satisfactory-to-satisfactory transition, a satisfactory-to-unsatisfactory transition, an unsatisfactory-to-satisfactory transition, and an unsatisfactory-to-unsatisfactory transition.

16. The service architecture of claim 13 wherein the samples of past performance comprise round-trip time statistics for network traffic sent on the at least one connection.

17. The service architecture of claim 16 further comprising collecting the round-trip time statistics for the network traffic sent on the at least one connection and collecting other round-trip time statistics for other network traffic sent on other connections between the application and other application resources in the service environment.

18. The service architecture of claim 12 wherein the application hosted employs a connection process to ensure that a healthy connection is maintained with one or more of the resources.

19. The service architecture of claim 18 wherein the at least one connection comprises a specific port allocated to the application for communications with a given resource.

20. The service architecture of claim 17 wherein the network traffic comprises actual service traffic exchanged between the application and a given resource in support of online session established between the application and a client application.

* * * * *